(12) United States Patent
Kim et al.

(10) Patent No.: US 8,793,071 B2
(45) Date of Patent: Jul. 29, 2014

(54) NAVIGATION METHOD OF MOBILE TERMINAL AND APPARATUS THEREOF

(75) Inventors: Su-Jin Kim, Seoul (KR); Suk-Jin Chang, Gyeonggi-Do (KR); Jong-Rak Lim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 592 days.

(21) Appl. No.: 12/819,918

(22) Filed: Jun. 21, 2010

(65) Prior Publication Data

US 2011/0106427 A1 May 5, 2011

(30) Foreign Application Priority Data

Nov. 5, 2009 (KR) .................. 10-2009-0106610

(51) Int. Cl.
*G08G 1/123* (2006.01)
*G01C 21/34* (2006.01)

(52) U.S. Cl.
USPC .......................................... 701/532; 701/533

(58) Field of Classification Search
None
See application file for complete search history.

(56) References Cited

U.S. PATENT DOCUMENTS

| 5,913,917 A | * | 6/1999 | Murphy ........................ 701/123 |
| 2005/0107951 A1 | * | 5/2005 | Brulle-Drews et al. ........ 701/209 |
| 2010/0049397 A1 | * | 2/2010 | Liu et al. ........................ 701/33 |
| 2010/0088012 A1 | * | 4/2010 | O'Sullivan et al. ........... 701/200 |

* cited by examiner

*Primary Examiner* — Paul Danneman
(74) *Attorney, Agent, or Firm* — Birch, Stewart, Kolasch & Birch, LLP

(57) ABSTRACT

A navigation apparatus including a wireless communication unit configured to wirelessly communicate with an entity; a controller configured to search a plurality of candidate paths from a current location to a destination from map data, and to calculate a fuel consumption index based on multiple road information conditions for a corresponding candidate path from the current location to the destination; and a display unit configured to display the calculated fuel consumption index for each of the plurality of candidate paths. Further, the fuel consumption index indicates an estimated amount of fuel used to travel the corresponding candidate path.

22 Claims, 10 Drawing Sheets

FIG. 13

| | FCI | TOLL | DISTANCE | TIME |
|---|---|---|---|---|
| ⦿ RECOMMENDATION 1 | ▇▇▇▇▇▇░ | $ 3.5 | 30Km | 48min |
| ○ RECOMMENDATION 2 | ▇▇▇▇▇░░ | $ 3.0 | 30Km | 49min |
| ○ RECOMMENDATION 3 | ▇▇▇▇░░░ | $ 4.0 | 41Km | 35min |

COMPARISON OF FCIs

PATH INFORMALTION | GUIDE START

NAVIGATION METHOD OF MOBILE TERMINAL AND APPARATUS THEREOF

CROSS-REFERENCE TO A RELATED APPLICATION

Pursuant to 35 U.S.C. §119(a), this application claims the benefit of earlier filing date and right of priority to Korean Application No. 10-2009-0106610 filed on Nov. 5, 2009, the contents of which are incorporated by reference herein in its entirety.

BACKGROUND OF THE INVENTION

1. Field of the Invention

The present invention relates to a navigation method of a mobile terminal and an apparatus thereof.

2. Background of the Invention

A navigation apparatus generates road guide information based upon global positioning system (GPS) signals and map information, and provides the road guide information to a user. However, the information provided is generally limited in nature and provides only basic road guide information.

SUMMARY OF THE INVENTION

Accordingly, an object of the present invention is to address the above-noted and other problems.

Another object of the present invention is to provide a novel navigation apparatus and corresponding method for calculating and displaying a fuel consumption index (FCI) based on multiple road information conditions for a corresponding candidate path from the current location to the destination.

To achieve these and other advantages and in accordance with the purpose of the present invention, as embodied and broadly described herein, the present invention provides in one aspect a navigation apparatus including a wireless communication unit configured to wirelessly communicate with an entity; a controller configured to search a plurality of candidate paths from a current location to a destination from map data, and to calculate a fuel consumption index based on multiple road information conditions for a corresponding candidate path from the current location to the destination; and a display unit configured to display the calculated fuel consumption index for each of the plurality of candidate paths. Further, the fuel consumption index indicates an estimated amount of fuel used to travel the corresponding candidate path.

In another aspect, the present invention provides a method of controlling a navigation apparatus, and which includes wirelessly communicate, via a wireless communication unit on the navigation apparatus, with an entity; searching, via a controller on the navigation apparatus, a plurality of candidate paths from a current location to a destination from map data; calculating, via the controller, a fuel consumption index based on multiple road information conditions for a corresponding candidate path from the current location to the destination; and displaying the calculated fuel consumption index for each of the plurality of candidate paths on a display unit. Further, the fuel consumption index indicates an estimated amount of fuel used to travel the corresponding candidate path.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 13 is an overview illustrating a vehicle fuel consumption amount, a toll, a distance and required time displayed on a navigation apparatus of a mobile terminal according to an embodiment of the present invention.

DETAILED DESCRIPTION OF THE INVENTION

Hereinafter, embodiments of a navigation method of a mobile terminal and an apparatus thereof capable of searching a plurality of paths from a current location to a destination, providing a vehicle fuel consumption amount for each of the searched plurality of paths to a user, and estimating a vehicle fuel consumption amount of each of the plurality of paths to provide an optimum path to the user will be described in detail with reference to FIGS. 1-13.

Figure 1:
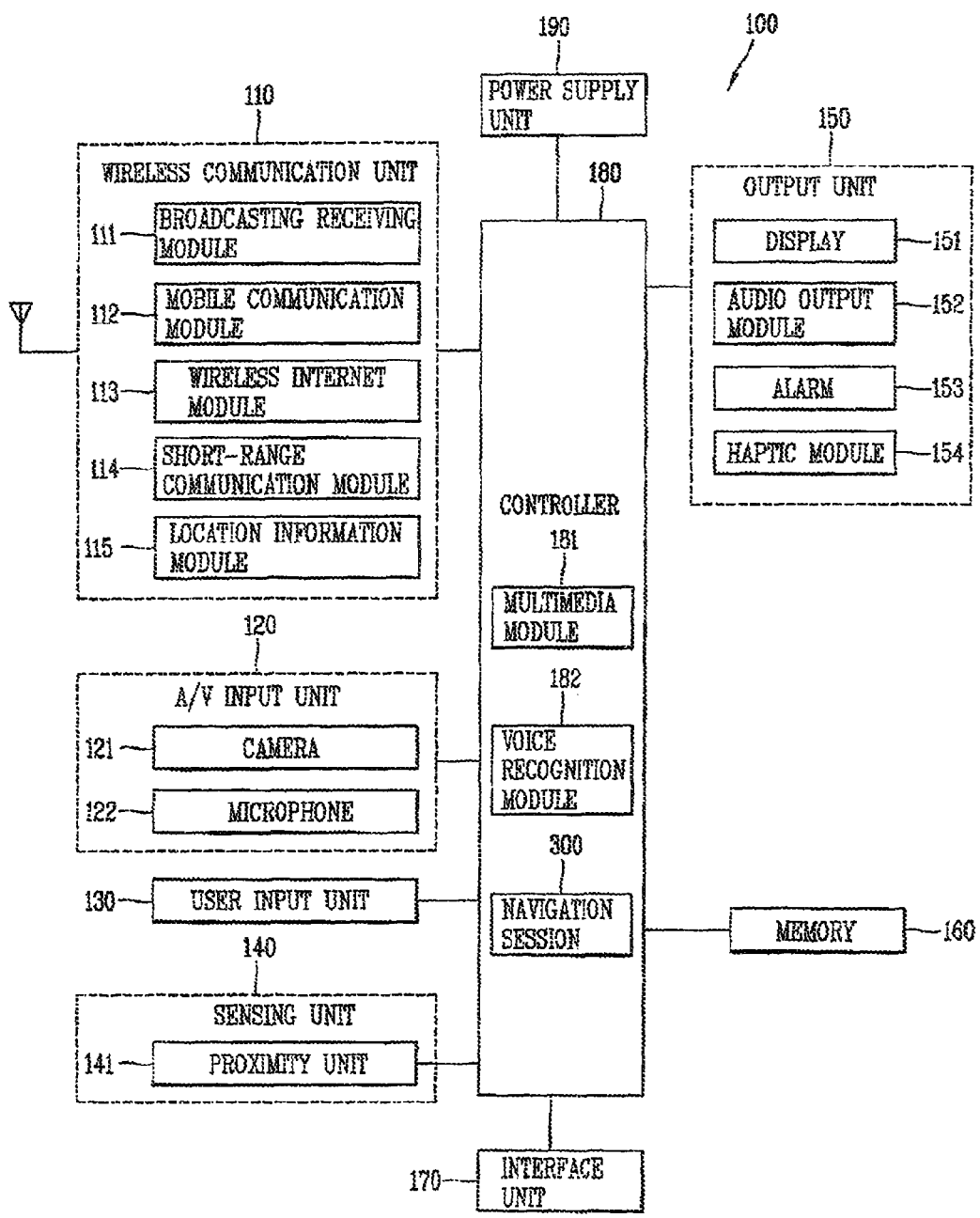
FIG. 1 is a block diagram illustrating a mobile communication terminal according to an embodiment of the present invention.

In more detail, FIG. 1 is a block diagram illustrating a mobile communication terminal 100 according to an embodiment of the present invention. Further, the mobile terminal (e.g., mobile phone) 100 may be implemented in various forms. For example, the mobile communication terminal 100 can be a portable phone, smart phone, notebook computer, digital broadcast receiver, personal digital assistant (PDA), portable multimedia player (PMP), and the like.

In the embodiment in FIG. 1, the mobile communication terminal 100 includes a wireless communication unit 110, an A/V (Audio/Video) input unit 120, a user input unit 130, a sensing unit 140, an output unit 150, a memory 160, an interface unit 170, a controller 180, a power supply unit 190, and the like. The mobile communication terminal 100 may be implemented with greater or less elements than the elements as illustrated in FIG. 1.

Further, the wireless communication unit 110 includes one or more elements allowing radio communication between the mobile communication terminal 100 and a wireless communication system, or allowing radio communication between the mobile communication terminal 100 and a network in which the mobile communication terminal 100 is located. For example, in FIG. 1, the wireless communication unit 110 includes a broadcast receiving module 111, a mobile communication module 112, a wireless Internet module 113, a short-range communication module 114, a location information module 115, and the like.

In more detail, the broadcast receiving module 111 receives broadcast signals and/or broadcast associated information from an external broadcast management server through a broadcast channel. The broadcast channel may include a satellite channel and/or a terrestrial channel. In addition, the broadcast management server corresponds to a server that generates and transmits a broadcast signal and/or broadcast associated information or a server that receives a previously generated broadcast signal and/or broadcast associated information and transmits the information to the mobile communication terminal 100. The broadcast associated information also corresponds to information regarding a broadcast channel, broadcast program, a broadcast service provider, and the like. Also, the broadcast signal may include a TV broadcast signal, a radio broadcast signal and a data broadcast signal as well as a broadcast signal in a form that a data broadcast signal is combined with the TV or radio broadcast signal.

Further, the broadcast associated information may also be provided through a mobile communication network, and in this instance, the broadcast associated information may be received by the mobile communication module 112. The broadcast signal may also exist in various forms such as in the form of an electronic program guide (EPG) of the digital multimedia broadcasting (DMB) system, an electronic service guide (ESG) of the digital video broadcast-handheld (DVB-H) system, and the like.

In addition, the broadcast receiving module 111 can receive a broadcast signal using various types of broadcast systems. In particular, the broadcast receiving module 111 can receive a digital broadcast signal using a digital broadcast system such as the digital multimedia broadcasting-terrestrial (DMB-T) system, the digital multimedia broadcasting-satellite (DMB-S) system, the media forward link only (MediaFLO) system, the digital video broadcast-handheld (DVB-H) system, the integrated services digital broadcast-terrestrial (ISDB-T) system, and the like. The broadcast receiving module 111 can also be configured to be suitable for all broadcast systems that provide a broadcast signal as well as the above-mentioned digital broadcast systems. The broadcast signal and/or broadcast-associated information received through the broadcast receiving module 111 can also be stored in the memory 160.

Further, the mobile communication module 112 transmits and/or receives a radio signal to and/or from at least one of a base station, an external terminal and a server over a mobile communication network. The radio signal may include a voice call signal, a video call signal and/or various types of data according to text and/or multimedia message transmission and/or reception. In addition, the wireless Internet module 113 corresponds to a module for supporting wireless Internet access and can be built-in or externally installed to the mobile communication terminal 100. A wireless Internet access technique including a WLAN (Wireless LAN), Wi-Fi, Wibro (Wireless Broadband), Wimax (World Interoperability for Microwave Access), HSDPA (High Speed Downlink Packet Access), and the like can also be used.

In addition, the short-range communication module 114 corresponds to a module for supporting a short-range communication. For example, a short-range communication technology including Bluetooth, Radio Frequency IDentification (RFID), Infrared Data Association (IrDA), Ultra WideBand (UWB), ZigBee, and the like can be used. Further, the location information module 115 is a module for checking or acquiring a location of the mobile terminal and a GPS module is an example. In more detail, the GPS module receives location information from a plurality of satellites in which the location information may include coordinate information represented by latitude and longitude values.

For example, the GPS module can measure an accurate time and distance from three or more satellites, and accurately calculate a current location according to trigonometry based upon three different distances. A method of acquiring distance and time information from three satellites and performing error correction with a single satellite can also be used. In particular, the GPS module can acquire an accurate time together with three-dimensional speed information as well as the location of the latitude, longitude and altitude values from the location information received from the satellites. For the location information module 115, a Wi-Fi positioning system and/or a hybrid positioning system may be applicable.

In addition, the AN (audio/video) input unit 120 receives an audio or video signal, and in FIG. 1 includes a camera 121 and a microphone 122. The camera 121 processes an image frame such as still picture or video obtained by an image sensor in a video phone call or image capturing mode. The processed image frames can also be displayed on a display unit 151 and be stored in the memory 160 (or other storage medium) or transmitted through the wireless communication unit 110. Two or more cameras 121 can also be provided according to the configuration type and/or use environment of the mobile terminal 100.

Further, the microphone 122 receives an external audio signal in a phone call mode, a recording mode, a voice recognition mode, and the like, and processes the audio signal into electrical voice data. The processed voice data is then converted and output into a format that is transmittable to a mobile communication base station through the mobile communication module 112 in the phone call mode. The microphone 122 may also implement various types of noise canceling algorithms to cancel noise generated in a procedure of receiving the external audio signal.

In addition, the user input unit 130 can generate input data to control an operation of the mobile terminal 100. The user input unit 130 may also be configured by including a keypad, a dome switch, a touch pad (pressure/capacitance), a jog wheel, a jog switch, and the like. Particularly, when the touch pad forms an interlayer structure together with the display unit 151, it may be called a touch screen.

The sensing unit 140 detects a current status of the mobile terminal 100 such as an opened or closed state of the mobile terminal 100, a location of the mobile terminal 100, the presence or absence of user contact, an orientation of the mobile terminal 100, an acceleration or deceleration movement of the mobile terminal 100, and the like, and generates a sensing signal for controlling the operation of the mobile terminal 100. For example, when the mobile terminal 100 is a slide phone type, the sensing unit 140 can sense an opened or closed state of the slide phone. Furthermore, the sensing unit 140 includes a sensing function for determining whether or not power is supplied from the power supply unit 190, and whether or not an external device is coupled with the interface unit 170.

In addition, the interface unit 170 performs a role of interfacing with external devices connected to the mobile communication terminal 100. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like. Here, the identification module may be configured as a chip for storing various information required to authenticate an authority for using the mobile communication terminal 100, which may include a User Identity Module (UIM), a Subscriber Identity Module (SIM), a Universal Subscriber Identity Module (USIM), and the like.

Also, the device provided with the identification module (hereinafter, referred to as 'identification device') may be implemented in the type of a smart card. Hence, the identification device can be coupled to the mobile communication terminal 100 via a port. The interface unit 170 can also receive data or power from an external device and transfer the received data or power to each element in the mobile terminal 100, or transmit data within the mobile terminal 100 to the external device.

In addition, the output unit 150 is configured to provide an output for audio signal, video signal, or alarm signal, and in FIG. 1, includes the display unit 151 (labeled "display" in FIG. 1), an audio output module 152, an alarm unit 153, a haptic module 154, and the like. The display unit 151 can display or output information processed in the mobile terminal 100. For example, when the mobile terminal 100 is in a phone call mode, the display unit 151 can display a User Interface (UI) or a Graphic User Interface (GUI) associated with a call. When the mobile terminal 100 is in a video call mode or image capturing mode, the display unit 151 can display a captured image and/or received image, a UI or GUI.

Further, the display unit 151 may include at least one of a Liquid Crystal Display (LCD), a Thin Film Transistor-LCD (TFT-LCD), an Organic Light Emitting Diode (OLED) display, a flexible display, and a three-dimensional (3D) display. Two or more display units 151 may also be provided. For example, an external display unit and an internal display unit can be simultaneously provided in the mobile terminal 100. Meanwhile, when the display unit 151 and a sensor for detecting a touch operation. (hereinafter, 'touch sensor') are formed with an interlayer structure (hereinafter, 'touch screen'), the display unit 151 can be also used as an input device in addition to an output device. The touch sensor can also be configured in a form of, for example, touch film, touch sheet, touch pad, or the like.

Furthermore, the touch sensor can be configured to convert a change such as pressure applied to a specific area of the display unit 151 or capacitance generated on a specific area of the display unit 151 into an electrical input signal. The touch sensor can also be configured to detect a touch input pressure as well as a touch input position and a touch input area. When there is a touch input to the touch sensor, a signal (or signals) corresponding to the touch input is sent to a touch controller. The touch controller then processes the signal (or signals) and sends the corresponding data to a controller 180. Thus, the controller 180 can determine whether or not any region is touched on the display unit 151.

Figure 2:
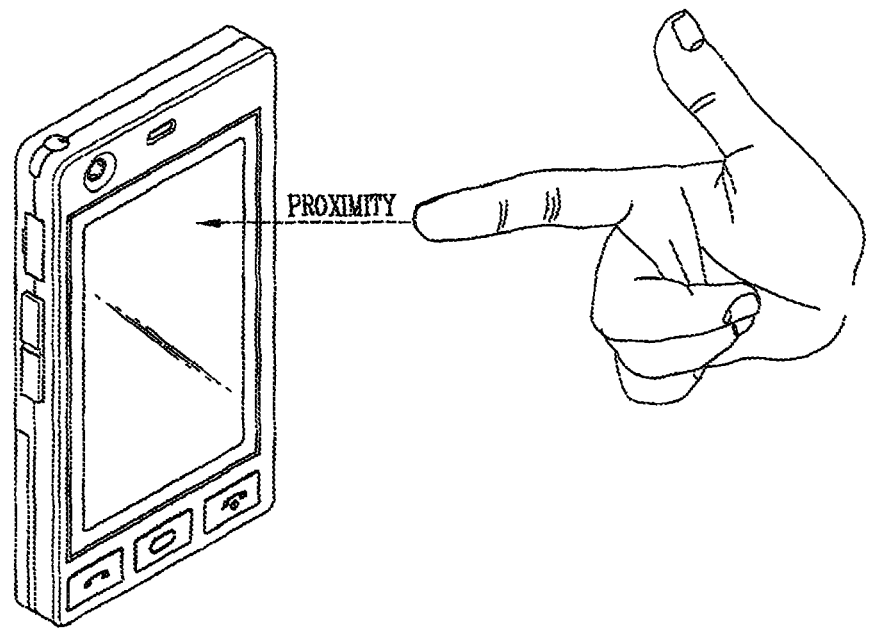
FIG. 2 is an overview illustrating a proximity touch process in a mobile communication terminal according to an embodiment of the present invention.

Hereinafter, a proximity sensor 141 included in the sensing unit 140 in FIG. 1 will be described with reference to FIG. 2. In more detail, FIG. 2 is an overview illustrating a proximity-touch process for the mobile terminal 100. In an embodiment of the present invention, a proximity-touch means a state that a pointer approaches to a screen while being apart a predetermined distance from the screen without actually touching the screen.

The proximity sensor 141 can also be arranged in an inner region of the mobile terminal 100 surrounded by a touch screen or be arranged adjacent to the touch screen. Further, the proximity sensor 141 is a sensor for detecting the presence or absence of an object approaching to a certain detection surface or an object that exists nearby using the force of electromagnetism or infrared rays without a mechanical contact. Thus, the proximity sensor 141 has a considerably longer life span compared with a contact type sensor, and can be utilized for various purpose's.

Examples of the proximity sensor 141 include a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like. When the touch screen is an electrostatic type, the approach of a pointer can be detected based on a change in a field according to the approach of the pointer. In this instance, the touch screen (touch sensor) may be classified as a proximity sensor.

In the following description, for the sake of brevity, recognition of the pointer positioned to be close to the touch screen, although the pointer is not actually brought into contact with the touch screen, will be called a "proximity touch," while recognition of actual contacting of the pointer on the touch screen will be called a "contact touch." The position where the pointer is proximately touched on the touch screen means a position where the pointer is positioned to correspond vertically to the touch screen when the pointer is proximately touched.

Furthermore, the proximity sensor 141 can detect a proximity touch, and a proximity touch pattern (for example, a proximity touch distance, a proximity touch direction, a proximity touch speed, a proximity touch time, a proximity touch position, a proximity touch movement state, or the like). Information corresponding to the detected proximity touch operation and the proximity touch pattern can also be output to the touch screen.

Returning to FIG. 1, the audio output module 152 can output audio data received from the wireless communication unit 110 or stored in the memory 160 in a call signal reception mode, a call mode, a record mode, a voice recognition mode, a broadcast reception mode, and the like. Also, the audio output module 152 can output an audio signal associated with the function performed by the mobile terminal 100 (for example, a call signal reception sound, a message reception sound, etc.). The audio output module 152 may include a receiver, a speaker, a buzzer, and the like.

In addition, the alarm unit 153 can also output a signal to notify a user of the terminal 100 about the occurrence of an event of the mobile terminal 100. Examples of the event occurring in the mobile terminal 100 include a call signal reception, message reception, a key signal input, a touch input, and the like. In addition to an audio or video output, the alarm unit 153 can also output a signal in a different manner to notify the user about the occurrence of an event. For example, the alarm unit 153 can output in a form of vibration. In addition, when a call signal or message is received, the alarm unit 153 can vibrate the mobile terminal 100 through vibration mechanisms.

Also, when a key signal is input, the alarm unit 153 can vibrate the mobile terminal 100 through vibration mechanisms using a feedback to the key signal input. The user can thus recognize an occurrence of the through vibration as described above. The signal for notifying an occurrence of the event can also be output through the display unit 151 or the audio output module 152.

In addition, the haptic module 154 generates various tactile effects felt by the user. A typical example of the tactile effects generated by the haptic module 154 is vibration. The intensity, pattern, or the like, generated by the haptic module 154 can also be controlled. For example, different vibrations may be combined and output or sequentially output. The haptic module 154, in addition to vibration, can generate various tactile effects including an effect by stimulation such as a pin arrangement vertically moving against the contacted skin surface, an ejection or suction force of air through the ejection or suction port, a brush against the skin surface, a contact of the electrode, electrostatic force, or the like, or an effect by reproduction of thermal sense using a heat absorption or generation device.

The haptic module 154 can also be implemented to feel a tactile effect through muscular senses by a finger or arm of the user as well as to transfer a tactile effect through direct contact. Two or more haptic modules 154 can also be provided. In addition, the haptic module 154 may be provided at a place frequently contacted by the user in a vehicle such as on a steering wheel, a gearshift lever, a seat, or the like.

Further, the memory 160 can store software programs for processing and controlling the controller 180, or temporarily store data (for example, phonebook, message, still image, video, and the like) that are input and/or output. The memory 160 may include at least one type of storage medium including a Flash memory type, a hard disk type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM) magnetic memory, a magnetic disk, an optical disk, and the like. Also, the mobile terminal 100 can run a web storage that performs the storage function of the memory 160 over the Internet, or operate in association with the web storage.

In addition, the interface unit 170 serves as an interface to external devices that may be connected with the mobile terminal 100. For example, the interface unit 170 may include a wired or wireless headset port, an external battery charger port, a wired or wireless data port, a memory card port, a ports for connecting a device having an identification module, an audio input/output (I/O) port, an video input/output (I/O) port, an earphone port, and the like. As discussed above, the identification module, as a chip that stores various information for authenticating the authority to use the mobile terminal 100, may include a user identity module (UIM), a subscriber identity module (SIM), a universal subscriber identity module (USIM), and the like. In addition, the device having the identification module ('identifying device') may be made in a form of smart card. Accordingly, the identifying device may be connected with the mobile terminal 100 through a port. The interface unit 170 can also receive data or power from an external device and transfer the received data or power to each element within the mobile terminal 100 or may be used to transfer data within the mobile terminal 100 to an external device.

Further, when the mobile terminal 100 is connected with an external cradle, the interface unit 170 can serve as a conduit to allow power from the cradle to be supplied therethrough to the mobile terminal 100 or can serve as a conduit to allow various command signals input from the cradle to be transferred to the mobile terminal 100 therethrough. Various command signals or the power input from the cradle can also operate as a signal for recognizing when the mobile terminal 100 is properly mounted on the cradle.

In addition, the controller 180 also controls a general operation of the mobile terminal 100. For example, the controller 180 performs a control and processing. operation associated with a voice call, a data communication, a video phone call, and the like. In addition, in FIG. 1, the controller 180 includes a multimedia module 181 for reproducing multimedia content. The multimedia module 181 may also be provided within the controller 180 or be separately provided from the controller 180. The controller 180 can also perform a pattern recognition processing to recognize a handwriting or picture-drawing input performed on the touch screen as a character or image, respectively. Further, the power supply unit 190 receives external or internal power to supply the power required for an operation of each element under a control of the controller 180.

Also, the function of an element applied to the mobile terminal 100 may be implemented in a computer-readable medium using software, hardware, or any combination thereof. For a hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some instances, such embodiments may be implemented in the controller 180.

For a software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

The controller 180 also includes a voice recognition module 182 that recognizes a voice from a user, and performs a relevant function based on the recognized voice signal. A navigation session 300 applied to the mobile terminal 100 is also included within the controller 180 and displays a travel path on data map. The navigation session 300 can also be separate from the controller 180.

Figure 3:
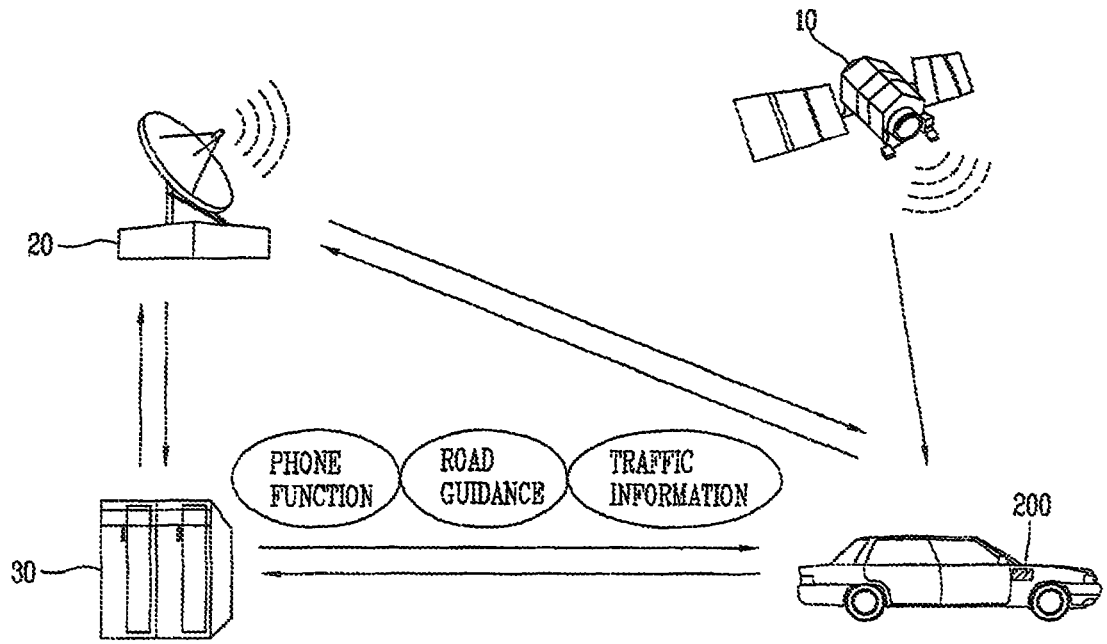
FIG. 3 is a block diagram illustrating a vehicle navigation system according to an embodiment of the present invention.

Next, FIG. 3 is a block diagram illustrating a vehicle navigation system according to an embodiment of the present invention. As illustrated in FIG. 3, the vehicle navigation system may be configured by including an information providing center 30 for providing traffic information and various data (for example, program, execution files, etc.), and a telematics terminal 200 mounted within a vehicle for receiving traffic information through a long-range wireless communication network 20 and/or a short-range wireless communication network, and providing a road guide service based on a GPS signal received through a satellite 10 and the traffic information. Here, the communication network may further include a wired/wireless communication network such as local area network (LAN), wide area network (WAN), and the like.

Various kinds of traffic information (for example, road traffic information, information on points of interest) including traffic light information are collected over the communication network, and the collected information is processed according to the transport protocol expert group (TPEG) specification in the information providing center 30 (for example, a server) and transmitted to a broadcasting station. Accordingly, the broadcasting station inserts traffic information including traffic light information into a broadcast signal and broadcasts the broadcast signal to the telematics terminal 200 included in the vehicle.

In addition, the server 30 processes various kinds of traffic information collected via several paths connected to the communication network such as the input of an operator, wired/wireless Internet, a transparent data channel (TDC), digital broadcasting service such as multimedia object transport (MOC), other servers, and probe cars. The server also reconfigures the collected traffic information according to a traffic information format, for example, a format according to the transport protocol expert group (TPEG) specification, which is a specification for traffic information services and transmits the reconfigured information to a broadcasting station.

The server 30 can also generate a traffic information format of the TPEG specification including traffic light information and transmit the generated format to a broadcasting station. Further, the broadcasting station loads the traffic information including traffic light information received from the server on a broadcast signal and transmits the broadcast signal in a wireless manner such that a traffic information receiving terminal, for example, a navigation device mounted in the vehicle, and the like, can receive the traffic information. The traffic information includes traffic light information and additionally may include information on various traffic conditions required for road, marine, and aviation services such as accidents, road conditions, traffic congestions, road constructions, closed roads, delay of public transport networks, and delay of aviation operations.

In addition, the broadcasting station receives traffic information processed by the server 30 and transmits the traffic information to the telematics terminal 200 through a digital signal according to various digital broadcasting specifications. For example, the broadcasting specifications may include a variety of digital broadcasting specifications such as Eureka 147 (ETSI EN 300 401) based on the European digital audio broadcasting (DAB) specification, the terrestrial or satellite digital multimedia broadcasting (DMB) specification, the terrestrial digital video broadcasting (DVB-T) specification, the digital video broadcasting-handheld (DVB-H) specification, and the media forward link only (MFLO) specification.

The broadcasting station can also transmit the traffic information including traffic light information over wired/wireless networks such as wired/wireless Internet. In addition, the vehicle including the telematics terminal 200 includes all kinds of carriers being implemented using mechanical and/or electronic devices for the purpose of carrying people or things such as general passenger cars, buses, trains, ships, and airplanes. Further, the vehicle is mounted with a traffic information receiving terminal (e.g., the telematics terminal 200) to receive traffic light information from the broadcasting station using the mounted traffic information receiving terminal, processes the traffic light information, and delivers the processed traffic light information to the user through graphics, texts and/or audios.

Figure 4:
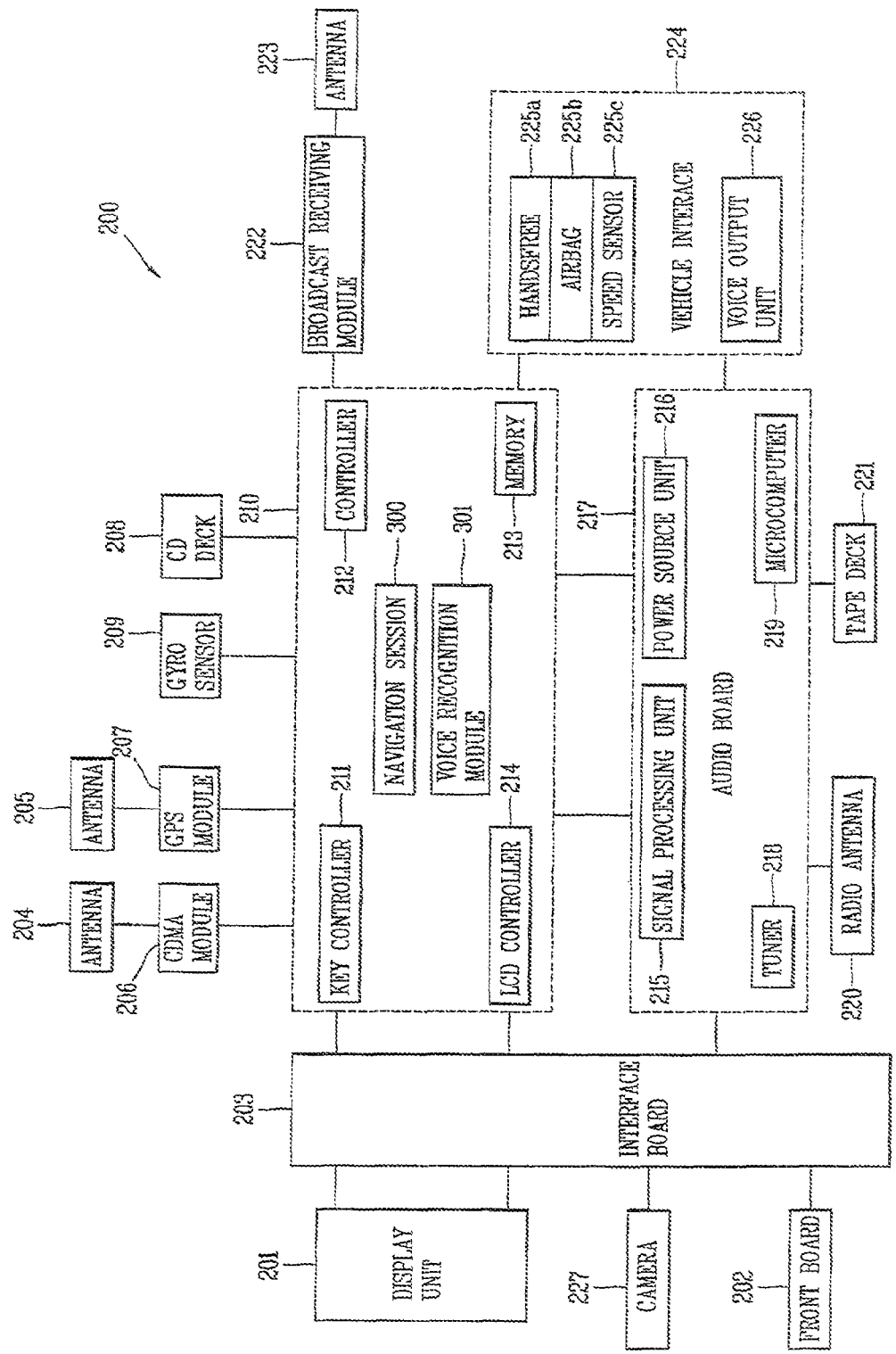
FIG. 4 is a block diagram illustrating a telematics terminal according to an embodiment of the present invention.

Next, FIG. 4 is a block diagram illustrating the telematics terminal 200 according to an embodiment of the present invention. As illustrated in FIG. 4, the telematics terminal 200 includes a central processing unit (CPU) or controller 212 for performing an overall control of the telematics terminal 200, a memory 213 for storing a variety of information, a key controller 211 for controlling a variety of key signals, and a main board 210 having an LCD controller 214 for controlling an liquid crystal display device (LCD) therein.

Further, the memory 213 stores map information (map data) for displaying road guide information on a digital map, and stores information for an algorithm of controlling traffic information collection to allow an input of traffic information depending on a road condition in which a vehicle is currently traveling, and for controlling the algorithm.

In addition, the main board 210 includes a code division multiple access (CDMA) module 206 serving as a mobile communication module and has a unique device number, a GPS module 207 for receiving a GPS signal to guide a location of a vehicle, track a traveling path from a departure to a destination, etc., and for transmitting traffic information collected by the user as a global positioning system (GPS) signal, a CD deck 208 for reproducing a signal recorded on a compact disk (CD), a gyro sensor 209, and the like. The CDMA module 206 and the GPS module 207 are also configured to transmit and receive a signal through antennas 204 and 205.

In addition, a broadcast receiving module 222 is connected to the main board 210 and receives broadcast signals through an antenna 223. The main board 210 is connected via an interface board 203 to a display unit (LCD) 201 controlled by the LCD controller 214, a front board 202 controlled by the key controller 211, and a camera 227 for capturing an inside and/or outside of the vehicle. The display unit 201 also displays a variety of video signals and text signals, and the front board 202 includes buttons for allowing an input of a variety of key signals so as to provide a key signal corresponding to a button selected by the user to the main board 210. In addition, the display unit 201 includes the proximity sensor 141 and a touch sensor (touch screen) of FIG. 2.

Further, the front board 202 includes a menu key for allowing a direct input of traffic information, and the menu key may be configured to be controlled by the key controller 211. The audio board 217 is also connected to the main board 210 and processes a variety of audio signals. In FIG. 4, the audio board 217 includes a microcomputer 219 for controlling the audio board 217, a tuner 218 for receiving a radio signal, a power unit 216 for supplying power to the microcomputer 219, and a signal processing unit 215 for processing a variety of voice signals.

In addition, the audio board 217 includes a radio antenna 220 for receiving a radio signal and a tape deck 221 for reproducing an audio tape. The audio board 217 also includes an audio/voice output unit (amplifier) 226 for outputting a voice signal processed by the audio board 217. Further, the audio output unit (amplifier) 226 is connected to a vehicle interface 224. In other words, the audio board 217 and the main board 210 are connected to the vehicle interface 224. A hands-free unit 225a for inputting a voice signal, an airbag 225b for passenger safety, a speed sensor 225c for detecting a vehicle speed and the like are connected to the vehicle interface 224. Also, the speed sensor 225c calculates a vehicle speed, and provides the calculated vehicle speed information to the central processing unit 212.

Further, the mobile vehicle navigation session 300 applied to the telematics terminal 200 generates road guide information based on map data and current vehicle location information, and notifies the generated road guide information to the user. Also, the display unit 201 senses a proximity touch within the display window through the proximity sensor 141. For example, when a pointer (for example, finger or stylus pen) is proximity-touched, the display unit 201 detects the position of the proximity touch, and outputs position information corresponding to the detected position to the controller 212.

In addition, the voice recognition device (or voice recognition module) 301 recognizes a user's voice, and performs a relevant function based on the recognized voice signal. The navigation session 300 applied to the mobile communication terminal 200 also displays a travel path on map data, and automatically forms a wireless network together with a terminal (for example, vehicle navigation device) mounted on a neighboring vehicle and/or a mobile communication terminal carried by a neighboring pedestrian through a wireless communication (for example, short-range wireless communication network) when the location of the mobile communication terminal 100 is within a predetermined distance from a dead zone included in the travel path. Thus, the session 300 can receive the location information of the neighboring vehicle from the terminal mounted on the neighboring vehicle, and receive the location information of the neighboring pedestrian from the mobile communication terminal carried by the neighboring pedestrian.

Further, the broadcast receiving module 222 can receive a broadcast signal including traffic information in a TPEG format from the broadcasting station through an antenna 223. The broadcast signal includes video and audio data according to various specifications such as the terrestrial or satellite digital multimedia broadcasting (DMB) system, the digital audio broadcasting (DAB) system, the digital video broadcasting (DVB-T, DVB-H) system, and the like. In addition, the broadcast signal includes traffic information according to traffic information (TPEG) services and binary format for scene (BIFS) data services, and supplementary information such as various supplementary data. Moreover, the broadcast signal receiver 222 synchronizes a signal bandwidth provided with traffic information, demodulates the synchronized signal, and outputs the decoded signal to the TPEG decoder included in a controller. Further, the TPEG decoder decodes traffic information in a TPEG format and provides a variety of information including traffic light information included in the traffic information to the controller 212.

Figure 5:
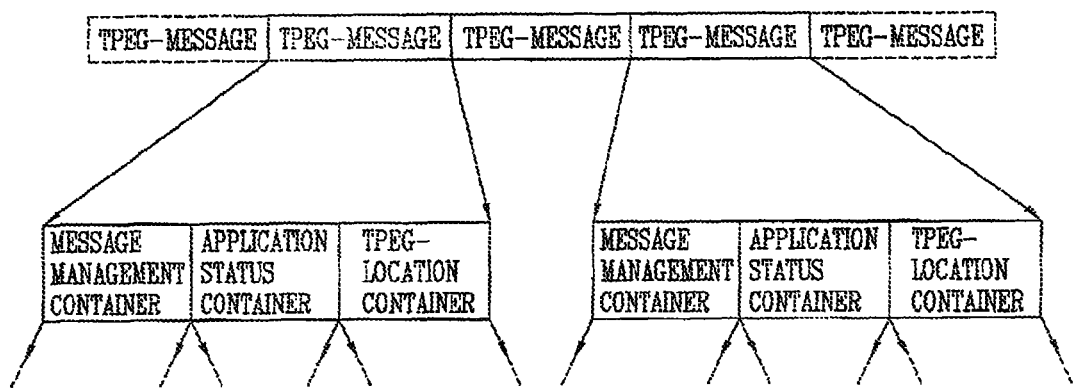
FIG. 5 is an overview illustrating a format of TPEG information according to an embodiment of the present invention.

Hereinafter, the format of TPEG information will be described with reference to FIG. 5. Referring to FIG. 5, the TPEG information includes a sequence of message segments (hereinafter, referred to as 'TPEG message'). The message segments may be applied to different applications. For instance, each TPEG message can be applied to any one of a TPEG-congestion and travel-time information application, a TPEG-road traffic message application, a TPEG-public transport information application, a TPEG-multimedia based traffic and travel information application, and other applications. In this embodiment, traffic light information can be applied to any one of the foregoing applications.

In addition, a unique identification number referred to as application identification (AID) is assigned to each TPEG application. In more detail, the application identification is used to decode a received TPEG message using the most appropriate application decoder. The road traffic message application is also assigned an AID 0001 (hex), the TPEG CTT is assigned an AID 0010 (hex), and the multimedia based traffic and travel information application is assigned an AID 0008 (hex), and the like.

Further, the TPEG message includes a message management container, an application status container, and a TPEG-location container. In more detail, the application status container has different contents according to the type of a TPEG message application. Traffic light information according to this embodiment can also be transmitted by being included in the application status container. As an example, when the TPEG message is a TPEG-congestion and travel-time information application (TPEG-CTT), traffic light information is transmitted by being included in the TPEG-CTT, which is an application status container. In this instance, the TPEG-CTT container may include congestion and travel time status information, prediction of congestion and travel time status information, additional information, and traffic light information according to this embodiment.

Further, the congestion and travel time status information includes information on an average link speed, travel time, link delay, and congestion time. The prediction of congestion and travel time status information also includes information on a prediction of average speed, travel time, a prediction of travel time, and congestion tendency. In addition, the additional information describes appended or supplementary information related to congestion and travel time in a text form. The TPEG decoder also decodes a TPEG message included in the broadcast signal to extract traffic light information, road information, and a variety of traffic information included in the TPEG message.

Figure 6:
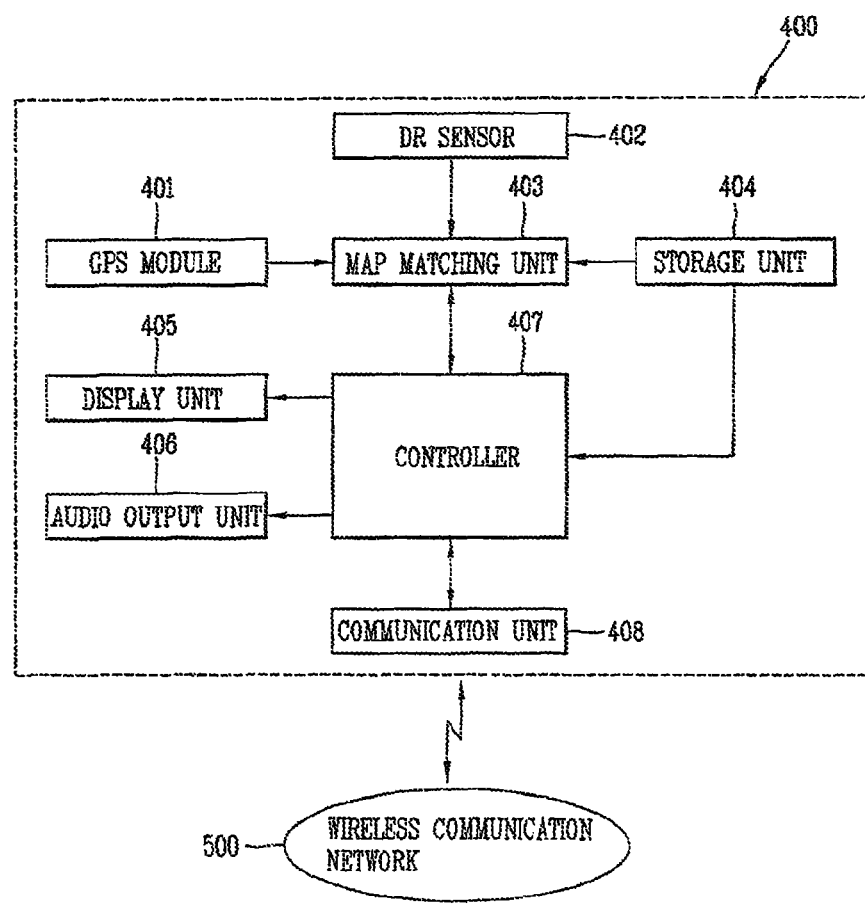
FIG. 6 is a block diagram illustrating a navigation apparatus in a mobile terminal according to an embodiment of the present invention.

Next, FIG. 6 is a block diagram illustrating a navigation (vehicle navigation) apparatus 400 in a mobile terminal according to an embodiment of the present invention. In more detail, the navigation (vehicle navigation) apparatus 400 can be classified into in-dash type and on-dash type depending on how the navigation vehicle 400 is installed in the vehicle 200. An in-dash type navigation (vehicle navigation) apparatus is firmly installed by being inserted in a predetermined space assigned in a dashboard of the vehicle 200. An on-dash type navigation (vehicle navigation) apparatus is either attached on a dash board of the vehicle 200 or installed using a dedicated mount near the dash board. Because the on-dash type navigation (vehicle navigation) can be detached and attached, it can be separated from the vehicle 200 to be carried by the user.

In addition, the navigation apparatus 400 according to an embodiment of the present invention includes both the aforementioned in-dash and on-dash type navigation apparatuses. In addition, the navigation apparatus 400 further includes all kinds of information processing devices, such as various portable terminals, capable of receiving and/or processing of traffic information to carry out a navigation function in association with a GPS receiver receiving navigation messages transmitted from GPS satellites in the vehicle 200.

As illustrated in FIG. 6, the navigation apparatus 400 includes a GPS module 401 for receiving a global positioning system (GPS) signal received from a satellite and generating first vehicle position data of a mobile vehicle navigation apparatus (assumed to be in the same location as the telematics terminal 200 or mobile communication terminal 100) based on the received GPS signal. Also included is a dead-reckoning (DR) sensor 402 for generating second vehicle position data based on a traveling direction of a vehicle and the vehicle speed; a storage unit (or memory) 404 for storing map data and various information; a map matching unit 403 for generating an estimated vehicle position based on the first vehicle position data and the second vehicle position data, and matching the generated vehicle position to a link (map matching link or map matching road) in the map data stored in the storage unit 404, and outputting the matched map information (map matching result); a communication unit 408 for receiving real-time traffic information from an information providing center and/or neighboring vehicles through a wireless communication network 500 and performing a phone communication; a controller 407 for generating road guide information based on the matched map information (map matching result); a display unit 405 for displaying a road guide map (including POI information) included in the road guide information and the traffic information; and an audio output unit 406 for outputting an audio signal corresponding to road guide voice information (road guide voice message) included in the road guide information or the traffic information.

If a destination is input by the user, the controller 407 searches a plurality of candidate paths from a current location to the destination from the map data, and calculates a vehicle fuel consumption amount for traveling each of the plurality of candidate paths based on road information corresponding to the each candidate path, and displays the calculated vehicle fuel consumption amount on the display unit 405. For example, the controller 407 displays a first fuel consumption amount for traveling a first candidate path, a second fuel consumption amount for traveling a second candidate path, and a third fuel consumption amount for traveling a third candidate path on the display unit 405, among the plurality of candidate paths.

The communication unit 408 further includes a hands-free module such as a Bluetooth module, and can receive a broadcast signal including traffic information in a TPEG format through an antenna. Furthermore, the road guide information may include various information associated with travel such as traffic lane information, travel speed limit information, turn-by-turn information, traffic safety information, traffic guide information, vehicle information, road search information, and the like, as well as map data.

The signal received through the GPS module 401 can also be configured to provide the location information of a terminal to the navigation apparatus 400 using wireless communication methods proposed by the Institute of Electrical and Electronics Engineers (IEEE), such as the IEEE 802.11 Wireless Network Standard for a wireless LAN including wireless LANs, some infrared communications, etc., the IEEE 802.15 Standard for a wireless personal area network (PAN) including Bluetooth, UWB, ZigBee, etc., the IEEE 802.16 Standard for a wireless metropolitan area network (MAN) broadband wireless access (BWA) including fixed wireless accesses (FWA), etc., and the IEEE 802.20 Mobile Internet Standard for a wireless MAN mobile broadband wireless access (MBWA) including Wibro, WiMAX, etc.

An input unit is also included in the navigation apparatus 400, and the input unit selects the user's desired function or receives information. Various input devices may be used such as a keypad, a touch screen, a jog shuttle, a microphone, and the like. Further, the map matching unit 403 generates an estimated location of the vehicle based on the first location data and the second location data, and reads map data corresponding to a travel path from the storage unit 404.

In addition, the map matching unit 403 matches the estimated location of the vehicle with a link (road) included in the map data, and outputs the matched map information to the controller 407. For example, the map matching unit 403 generates an estimated location of the vehicle based on the first location data and the second location data, matches the generated estimated location of the vehicle with links within the map data stored in the storage unit 404 based upon the link sequence thereof, and outputs the matched map information to the controller 407. The map matching unit 403 can also output road attribute information such as single-level or double-level roads included in the matched map information (map-matched result) to the controller 407. Furthermore, the function of the map matching unit 403 may be implemented by the controller 407.

In addition, the storage unit 404 stores map data that can include a geographic coordinate (or longitude and latitude coordinate) for displaying the longitude and latitude in the Degree/Minute/Second (DMS) unit. The stored map data may also use the Universal Transverse Mercator (UTM) coordinate, the Universal Polar System (UPS) coordinate, the Transverse Mercator (TM) coordinate, and the like, in addition to the geographic coordinate. Further, the storage unit 404 stores various information such as various menu screens, points of interest (hereinafter, "POI"), function characteristic information based upon specific locations of the map data, and the like, and various user interfaces (UI) and/or graphic user interfaces (GUI). The storage unit 404 also stores data, programs, and the like, which are used for operating the navigation device 400.

In addition, the storage unit 404 stores destination information input from the user through the input unit and which may be a destination, or either one of a departure and a destination. Further, the display unit 405 displays image information (or a road guide map) included in the road guide information generated by the controller 407. Also, the display unit 405 may include a touch sensor (touch screen) or proximity sensor. Furthermore, the road guide information may include various information associated with driving a vehicle such as traffic lane information, driving speed limit information, turn-by-turn information, traffic safety information, traffic guide information, vehicle information, road search information, and the like, in addition to map data.

In addition, when displaying the image information, the display unit 405 may display various contents such as various menu screens, road guide information, and the like, using user interfaces and/or graphic user interfaces included in the storage unit 404. The contents displayed on the display unit 405 include various text or image data including map data or various information data, and menu, screens including icons, list menus, combo boxes, and the like. Further, the audio output unit 406 outputs voice information or voice messages for road guide information included in the road guide information generated by the controller 407. The audio output unit 406 may also be an amplifier or speaker.

In addition, the controller 407 generates road guide information based on the matched map information, and outputs the generated road guide information to the display unit 405 and audio output unit 406. The display unit 405 also displays the road guide information. Further, the controller 407 receives real-time traffic information from the information providing center and/or a terminal mounted on a neighboring vehicle to generate road guide information.

Furthermore, the controller 407 is connected with a call center through the communication unit 408 to perform a phone call, and transmit or receive information between the navigation device 400 and the call center. The communication unit 408 can also include a hands-free module having a Bluetooth function using a short-range wireless communication method. Also, if a POI search menu is selected by the user, the controller 407 searches a POI located on a path from a current position to a destination, and displays the searched POI on the display unit 405. The controller 407 also searches a POI (a point not requiring the path to be changed (searched again), for example, a POI located on the left or right of a traveling road) and/or a POI located in the vicinity of the path (a point requiring the path to be changed, for example, a point requiring the predetermined path to be changed in order to pass through a neighboring POI), and displays the searched POI on the display unit 405.

Hereinafter, a navigation method of a mobile terminal according to an embodiment of the present invention will be described with reference to FIGS. 7 and 8. FIG. 6 will also be referred to throughout the rest of the description of the present invention. Further, a navigation apparatus and a method thereof according to an embodiment of the present invention may be applicable to various terminals such as a smart phone, a notebook computer, a personal digital assistant (PDA), a portable multimedia player (PMP), and the like, as well as the mobile communication terminal 100, the telematics terminal 200, and the vehicle navigation device 400.

Figure 7:
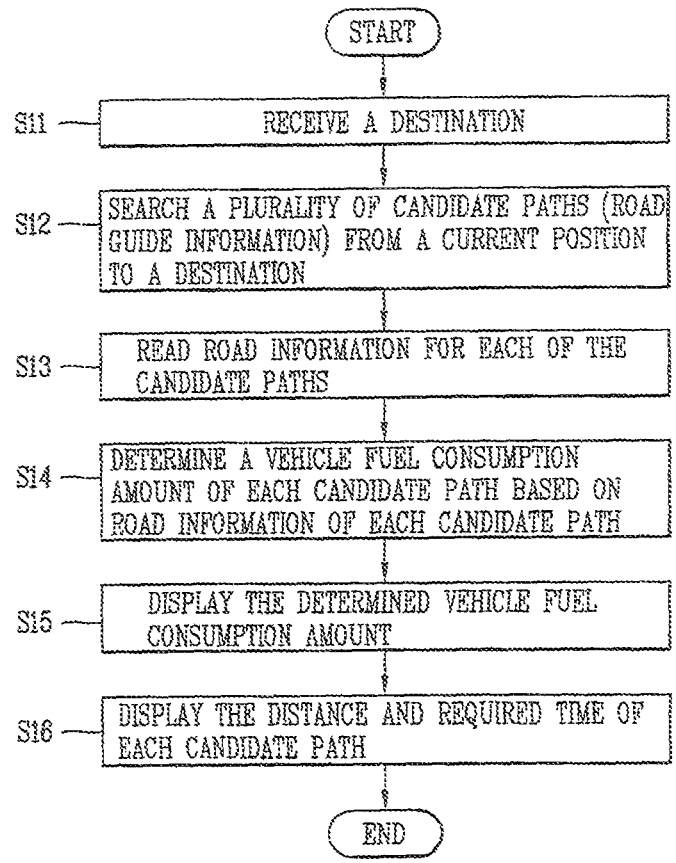
FIG. 7 is a flow chart illustrating a navigation method of a mobile terminal according to an embodiment of the present invention.

FIG. 7 is a flow chart illustrating a navigation method of a mobile terminal according to an embodiment of the present invention. As shown, when receiving a destination from the user (S11), the controller 407 searches a plurality of candidate paths (road guide information) from a current position to a destination (S12). For example, the controller 407 searches a plurality of candidate paths that can be traveled from the current position to the destination. Further, the plurality of candidate paths may include a path for preferentially searching urban highways including main roads and expressways, a path for preferentially searching national or local roads, and a path for preferentially searching roads having many lanes or having a wide lane width.

Thus, when the controller 407 searches a plurality of candidate paths from the current position to the destination, the controller 407 reads or receives road information corresponding to each of the plurality of candidate paths (S13). The controller 407 can also extract the road information from the map data or receive the information from an information providing center through a wireless communication network. The road information may include at least one of a road section having a predetermined road inclination, a curved road section, a stop-and-start road section, a road section having an abnormal road surface, and a standard road section. In addition, the standard road section represents a road section excluding the road section having a predetermined road inclination, the curved road section, the stop-and-start road section, and the road section having an abnormal road surface in the each candidate path.

The controller 407 also sums a fuel consumption amount of the road section having a predetermined road inclination, a fuel consumption amount of the curved road section, a fuel consumption amount of the stop-and-start road section, a fuel consumption amount of the road section having an abnormal road surface, and a fuel consumption amount of the standard road section in the each candidate path, and determines the summed value as a total fuel consumption amount being consumed to travel the each candidate path (S14). In other words, the controller 407 determines a vehicle fuel consumption amount of each candidate path according to the road information of the each candidate path.

The controller 407 also displays a total fuel consumption amount being consumed to travel each candidate path on the display unit 405 (S15). In addition, the controller 407 may display the calculated fuel consumption amount using a graph (for example, a bar graph). Further, the controller 407 detects each distance of the plurality of candidate paths from the map data, and displays the detected distance on the display unit 405. Furthermore, the controller 407 detects each required time of the plurality of candidate paths from the map data, and displays the detected required time and the distance on the display unit 405 (S16).

Hereinafter, a vehicle fuel consumption amount, and a distance and a required time displayed according to the road information of the each candidate path will be described with reference to FIG. 8. In more detail, FIG. 8 is an overview illustrating a vehicle fuel consumption amount, and a distance and a required time for the each candidate path displayed on a navigation apparatus of a mobile terminal according to an embodiment of the present invention.

Figure 8:
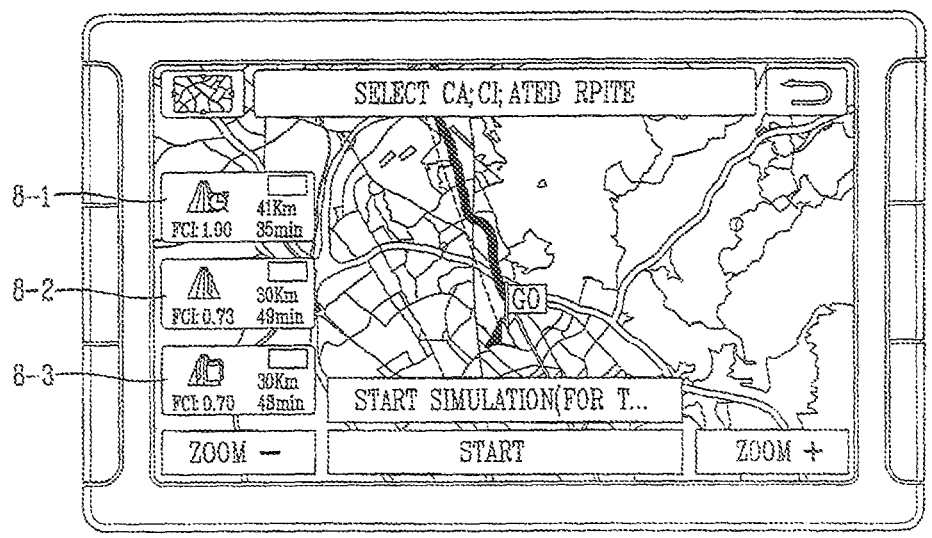
FIG. 8 is an overview illustrating a vehicle fuel consumption amount, a distance and a required time for each of the candidate paths displayed on a navigation apparatus of a mobile terminal according to an embodiment of the present invention.

As illustrated in FIG. 8, if a destination is input by the user, the controller 407 searches a plurality of candidate paths from a current position to the destination, calculates a vehicle fuel consumption amount for traveling each candidate path based on the road information corresponding to each of the plurality of candidate paths (for example, a first candidate path, a second candidate path, and a third candidate path), and displays the calculated fuel consumption amount on the display unit 405. For example, the controller 407 displays a first fuel consumption index (FCI) 8-1 for traveling the first candidate path (for example, a fastest path), a second fuel consumption index (FCI) 8-2 for traveling the second candidate path (for example, a shortest path), and a third fuel consumption index (FCI) 8-3 for traveling the third candidate path (for example, an ecological or scenic path) on the display unit 405.

Here, the controller 407 may display fuel consumption indices by creating an index of the fuel consumption amounts to compare with other candidate paths. In addition, the fast path may be set as a reference fuel consumption amount, and an index of the fuel consumption amounts for the short path and scenic path may be created to be displayed. A low value of the fuel consumption index also represents a small fuel consumption amount. Thus, in FIG. 8, the user can see the fuel consumption amount is lowest for the path 8-3.

Figure 9:
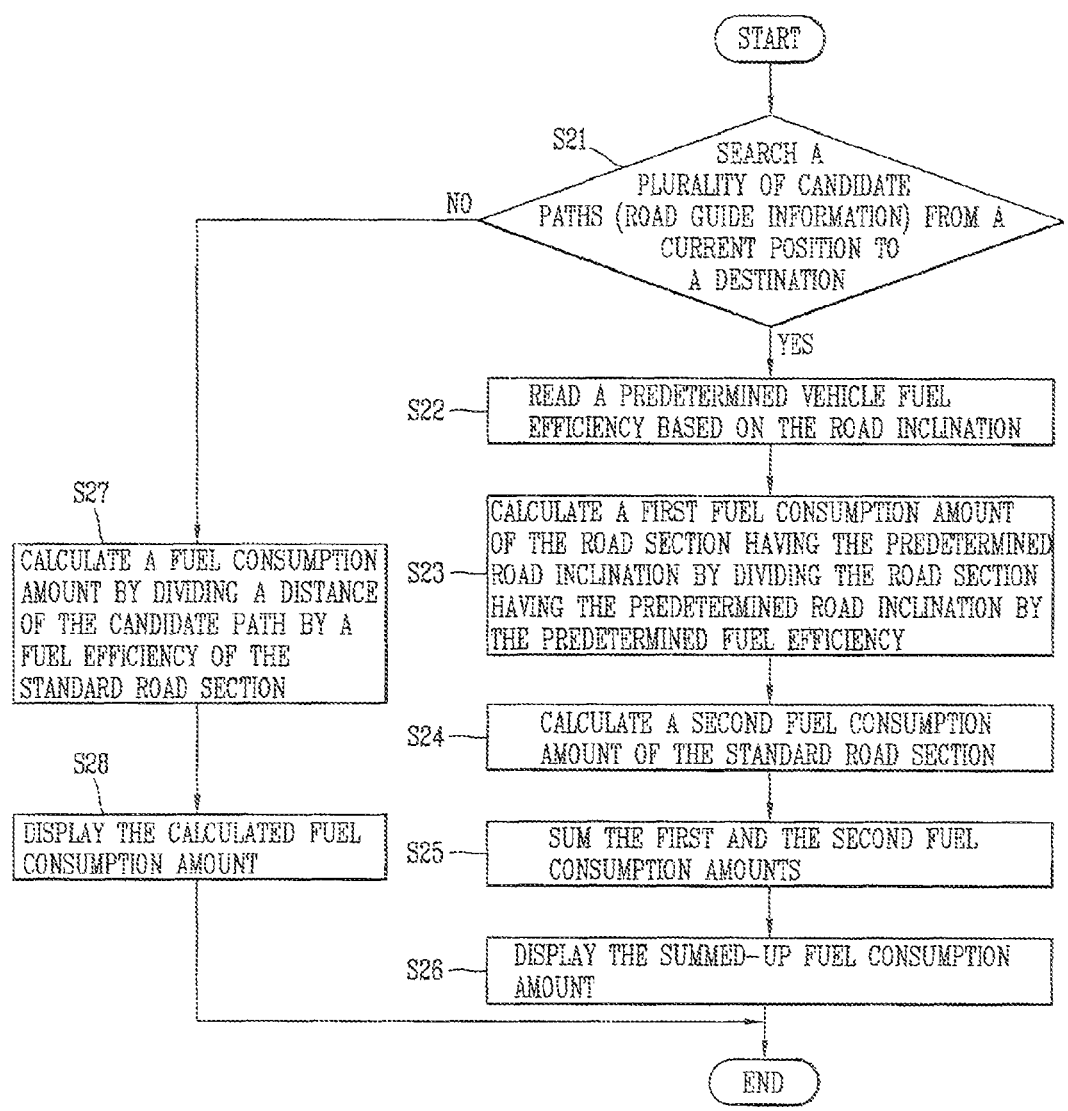
FIG. 9 is a flow chart illustrating a method of detecting a fuel consumption amount of a road section having a road inclination included in road information according to an embodiment of the present invention.

Next, a method of determining a vehicle fuel consumption amount of each candidate path according to a road section having a road inclination included in the road information of each candidate path will be described with reference to the flow chart of FIG. 9. As shown, the controller 407 determines whether or not a road section having a predetermined road inclination exists in road information corresponding to each candidate path (S21). The controller 407 then reads a predetermined vehicle fuel efficiency based on the road inclination from the storage unit 404 when a road section having the predetermined road inclination exists in the road information (S22).

Further, the controller 407 divides the road section having the predetermined road inclination by a predetermined vehicle fuel efficiency based on the road inclination to calculate a fuel consumption amount of the road section having the predetermined road inclination (S23). For example, assuming that the fuel efficiency is 10 km/l when the road inclination is 45 degrees, and the road section having an inclination of 45 degrees is 10 km, the controller 407 can calculate a fuel consumption amount of the road section having the predetermined road inclination by dividing the road section (10 km) by the fuel efficiency (10 km/l) (road section (10 km)/fuel efficiency (10 km/l)=1 liter). In other words, the fuel use amount being consumed for traveling a road of 10 km having an inclination of 45 degrees will be 1 liter. In addition, the fuel efficiency of when the road inclination is 45 degrees can be measured through an experiment, and the fuel efficiency based on each inclination can also be measured by actually traveling a road having the inclination.

The controller 407 also calculates a fuel consumption amount of the standard road section based on the standard fuel efficiency (official fuel efficiency, 11 km/l). (S24). For example, assuming that a total distance corresponding to each path is 100 km and a distance of the standard road section in the total distance is 90 km, the standard road section (90 km) is divided by the fuel efficiency (11 km/l) to calculate a fuel consumption amount of the standard road section (standard road section (90 km)/fuel efficiency (11 km/l) =about 8.18 liter).

The controller 407 also sums a fuel consumption amount of the road section having the predetermined road inclination and a fuel consumption amount of the standard road section (S25). For example, assuming that a distance of the first candidate path among the plurality of candidate paths is 100 km, there exists a road section of 10 km having the predetermined road inclination in the road information corresponding to the first candidate path, and the standard road section is 90 km (100 km−10 km=90 km), the fuel consumption amount of 1 liter for the road section having the predetermined road inclination and the fuel consumption amount of 8.18 liter for the standard road section are summed, thereby calculating a fuel consumption amount of the first candidate path (1 liter+ 8.18 liter=about 9.18 liter). The controller 407 then displays the summed fuel consumption amount on the display unit 405 (S26).

On the contrary, if a road section having the predetermined road inclination does not exist in road information corresponding to each candidate path (No in S21), the controller 407 calculates a fuel consumption amount of the candidate path by dividing a distance of the candidate path by a fuel efficiency of the standard road section (S27). For example, assuming that a distance corresponding to the candidate path is 100 km, the fuel consumption amount of the standard road section can be calculated by dividing the standard road section (100 km) by an official fuel efficiency (11 km/l) (standard road section (100 km)/fuel efficiency (11 km/l)=about 9.09 liter): The controller 407 then displays the calculated fuel consumption amount on the display unit 405 (S28).

Figure 10:
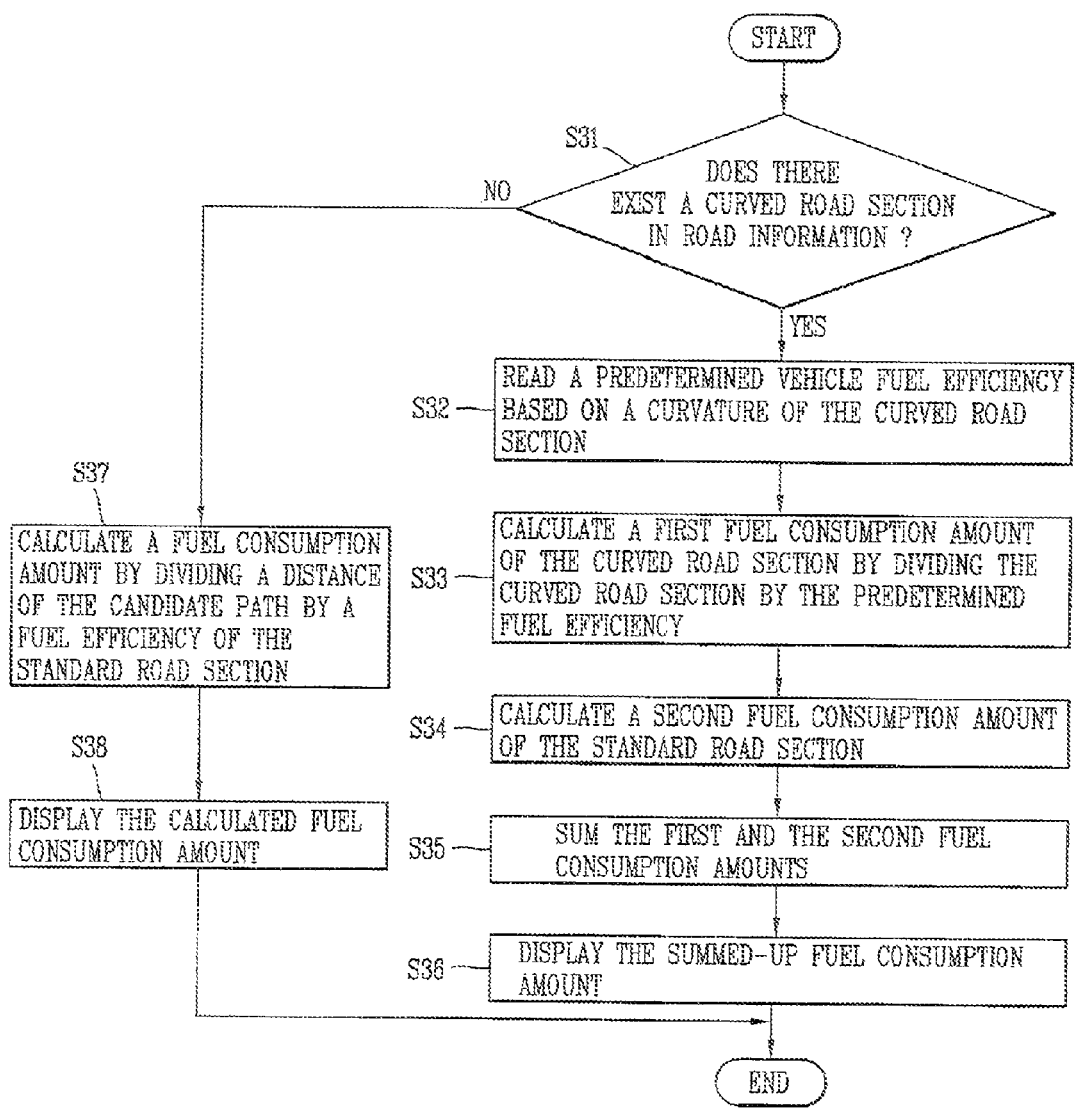
FIG. 10 is a flow chart illustrating a method of detecting a fuel consumption amount of a curved road section included in road information according to an embodiment of the present invention.

Hereinafter, a method of detecting a vehicle fuel consumption of each candidate path amount according to a curved road section included in the road information of the each candidate path will be described with reference to flowchart of FIG. 10. As shown, the controller 407 first determines whether or not a curved road section exists in road information corresponding to each candidate path (S31).

When the curved road section exists in the road information (Yes in S31), the controller 407 reads a predetermined vehicle fuel efficiency based on a curvature (curvature radius) of the curved road section from the storage unit 404 (S32). The controller 407 also divides the curved road section by a predetermined vehicle fuel efficiency based on the curved road section to calculate a fuel consumption amount of the curved road section (S33). For example, assuming that the fuel efficiency is 10 km/l when the curvature radius of the curved road section is 100 m, the controller 407 can calculate a fuel consumption amount of the curved road section by dividing the curved road section (100 m) by the fuel efficiency (10 km/l) (road section (100 m)/fuel efficiency (10 km/l)=1 liter).

In other words, the fuel use amount being consumed for traveling the curved road section of 100 m will be 0.01 liter. In addition, the fuel efficiency of when the curvature radius of the curved road section is 100 m can be measured through an experiment, and the fuel efficiency based on each curvature radius can also be measured by actually traveling a curved road section having various curvature radii. Also, a plurality of the curved road sections may exist on each candidate path.

The controller 407 then calculates a fuel consumption amount of the curved road section and calculates a fuel consumption amount of the standard road section based on the standard fuel efficiency (official fuel efficiency, 11 km/l) (S34). For example, assuming that a total distance corresponding to each path is 100 km and a distance of the standard road section in the total distance is 90 km, the standard road section (90 km) is divided by the fuel efficiency (11 km/l) to calculate a fuel consumption amount of the standard road section (standard road section (90 km)/fuel efficiency (11 km/l)=about 8.18 liter).

In addition, the controller 407 sums a fuel consumption amount of the curved road section and a fuel consumption amount of the standard road section (S35). For example, assuming that a distance of the first candidate path among the plurality of candidate paths is 100 km, there exist 100 of the 100 m-curved road sections in road information corresponding to the first candidate path (100*100 m=10km), and the standard road section is 90 km (100 km−10 km=90 km), the fuel consumption amount of 1 liter (0.01 liter*100=1 liter) for the curved road section and the fuel consumption amount of 8.18 liter for the standard road section are summed, thereby calculating a fuel consumption amount of the first candidate path (1 liter+8.18 liter=about 9.18 liter). The controller 407 then displays the summed-up fuel consumption amount on the display unit 405 (S36).

On the contrary, if the curved road section does not exist in road information corresponding to each candidate path (No in S31), the controller 407 calculates a fuel consumption amount of the candidate path by dividing a distance of the candidate path by a fuel efficiency of the standard road section (S37). For example, assuming that a distance corresponding to the candidate path is 100 km, the fuel consumption amount of the standard road section can be calculated by dividing the standard road section (100 km) by an official fuel efficiency (11 km/l) (standard road section (100 km)/fuel efficiency (11 km/l)=about 9.09 liter). The controller 407 then displays the calculated fuel consumption amount on the display unit 405 (S38).

Figure 11:
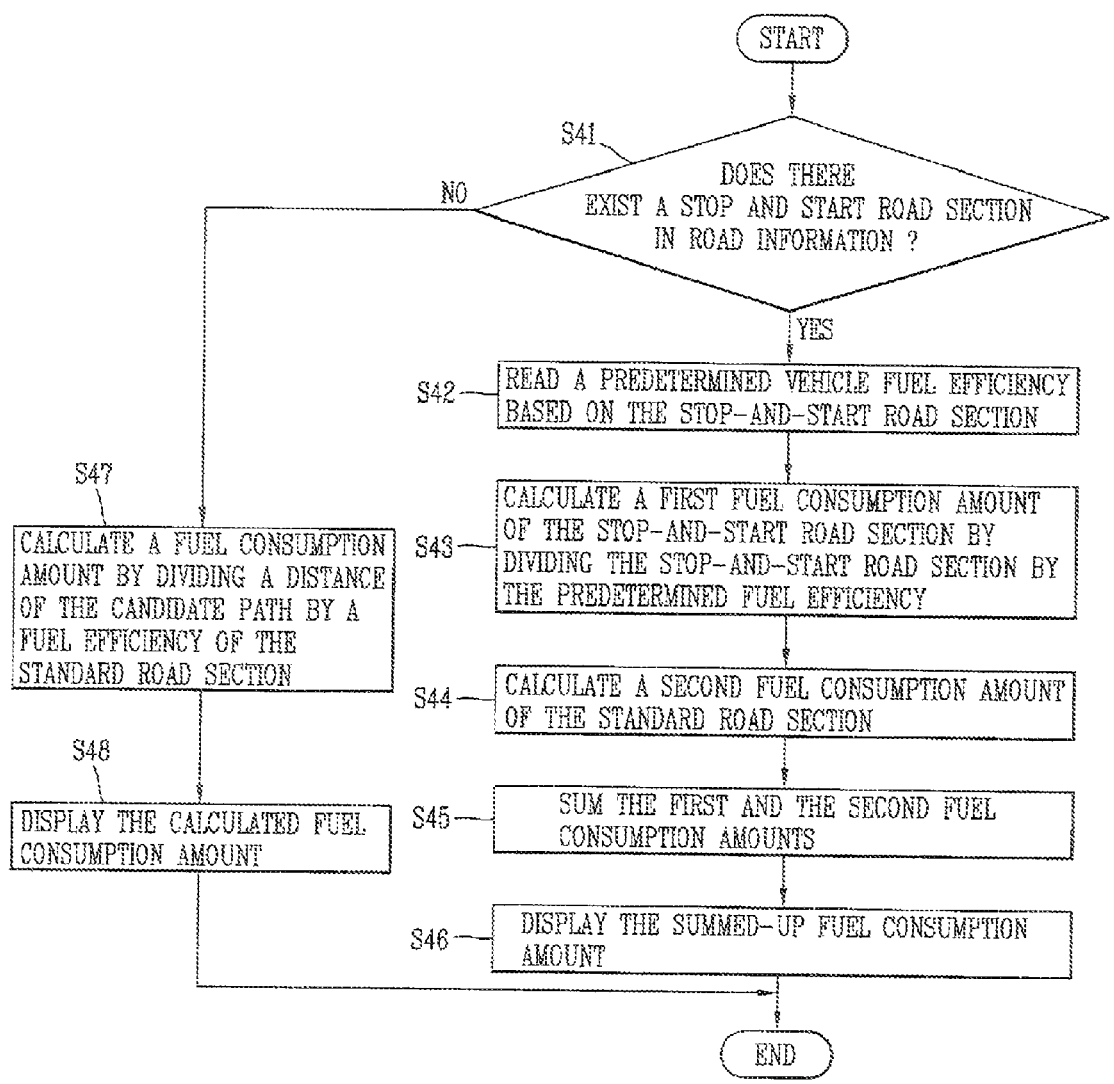
FIG. 11 is a flow chart illustrating a method of detecting a fuel consumption amount of a stop-and-start road section included in road information according to an embodiment of the present invention.

Hereinafter, a method of detecting a vehicle fuel consumption of each candidate path amount according to a stop-and-start road section included in the road information of the each candidate path will be described with reference to the flowchart in FIG. 11. As shown, the controller 407 first determines whether or not a stop-and-start road section exists in road information corresponding to the each candidate path (S41). Further, the stop-and-start road section may include a crossroad section, a traffic light section, habitual congestion section (e.g., a rush hour congestion section), etc.

When the stop-and-start road section exists in the road information (Yes in S41), the controller 407 reads a predetermined vehicle fuel efficiency based on the stop-and-start road section from the storage unit 404 (S42). The controller 407 then divides the stop-and-start road section by a predetermined vehicle fuel efficiency based on the stop-and-start road section to calculate a fuel consumption amount of the stop-and-start road section (S43). For example, assuming that the stop-and-start road section is a crossroad section and the fuel efficiency is 10 km/l when the crossroad section is 100 m, the controller 407 can calculate a fuel consumption amount-of the stop-and-start road section by dividing the stop-and-start road section (100 m) by the fuel efficiency (10 km/l) (road section (100 m)/fuel efficiency (10 km/l)=0.01 liter). In other words, the fuel use amount being consumed for traveling the stop-and-start road section of 100 m will be 0.01 liter.

In addition, the fuel efficiency of when the stop-and-start road section is 100 m can be measured through an experiment, and the fuel efficiency based on each stop-and-start road section can also be measured by actually traveling various stop-and-start road section (for example, a crossroad section, a traffic light section, habitual congestion section (e.g., rush hour congestion section). Furthermore, a fuel consumption amount of the stop-and-start road section may be measured by modeling fuel consumption amounts for the deceleration section and stop section for coming to a stop, and the acceleration section after coming a stop. A plurality of the stop-and-start road sections may also exist on each candidate path.

The controller 407 also calculates a fuel consumption amount of the stop-and-start road section and calculates a fuel consumption amount of the standard road section based on the standard fuel efficiency (official fuel efficiency, 11 km/l) (S44). For example, assuming that a total distance corresponding to each path is 100 km and a distance of the standard road section in the total distance is 90 km, the standard road section (90 km) is divided by the fuel efficiency (11 km/l), thereby calculating a fuel consumption amount of the standard road section (standard road section (90 km)/fuel efficiency (11 km/l)=about 8.18 liter).

In addition, the controller 407 sums a fuel consumption amount of the stop-and-start road section and a fuel consumption amount of the standard road section (S45). For example, assuming that a distance of the first candidate path among the plurality of candidate paths is 100 km, there exist 100 of the 100 m-stop-and-start road section in road information corresponding to the first candidate path (100*100 m 10 km), and the standard road section is 90 km (100 km−10 km=90 km), the fuel consumption amount of 1 liter (0.01 liter*100=1 liter) for the stop-and-start road section and the fuel consumption amount of 8.18 liter for the standard road section are summed, thereby calculating a fuel consumption amount of the first candidate path (1 liter+8.18 liter=about 9.18 liter). The controller 407 then displays the summed-up fuel consumption amount on the display unit 405 (S46).

On the contrary, if the stop-and-start road section does not exist in road information corresponding to the each candidate path (No in S41), the controller 407 calculates a fuel consumption amount of the candidate path by dividing a distance of the candidate path by a fuel efficiency of the standard road section (S47). For example, assuming that a distance corresponding to the candidate path is 100 km, the fuel consumption amount of the standard road section can be calculated by dividing the standard road section (100 km) by an official fuel efficiency (11 km/l) (standard road section (100 km)/fuel efficiency (11 km/l)=about 9.09 liter). The controller 407 then displays the calculated fuel consumption amount on the display unit 405 (S48).

Figure 12:
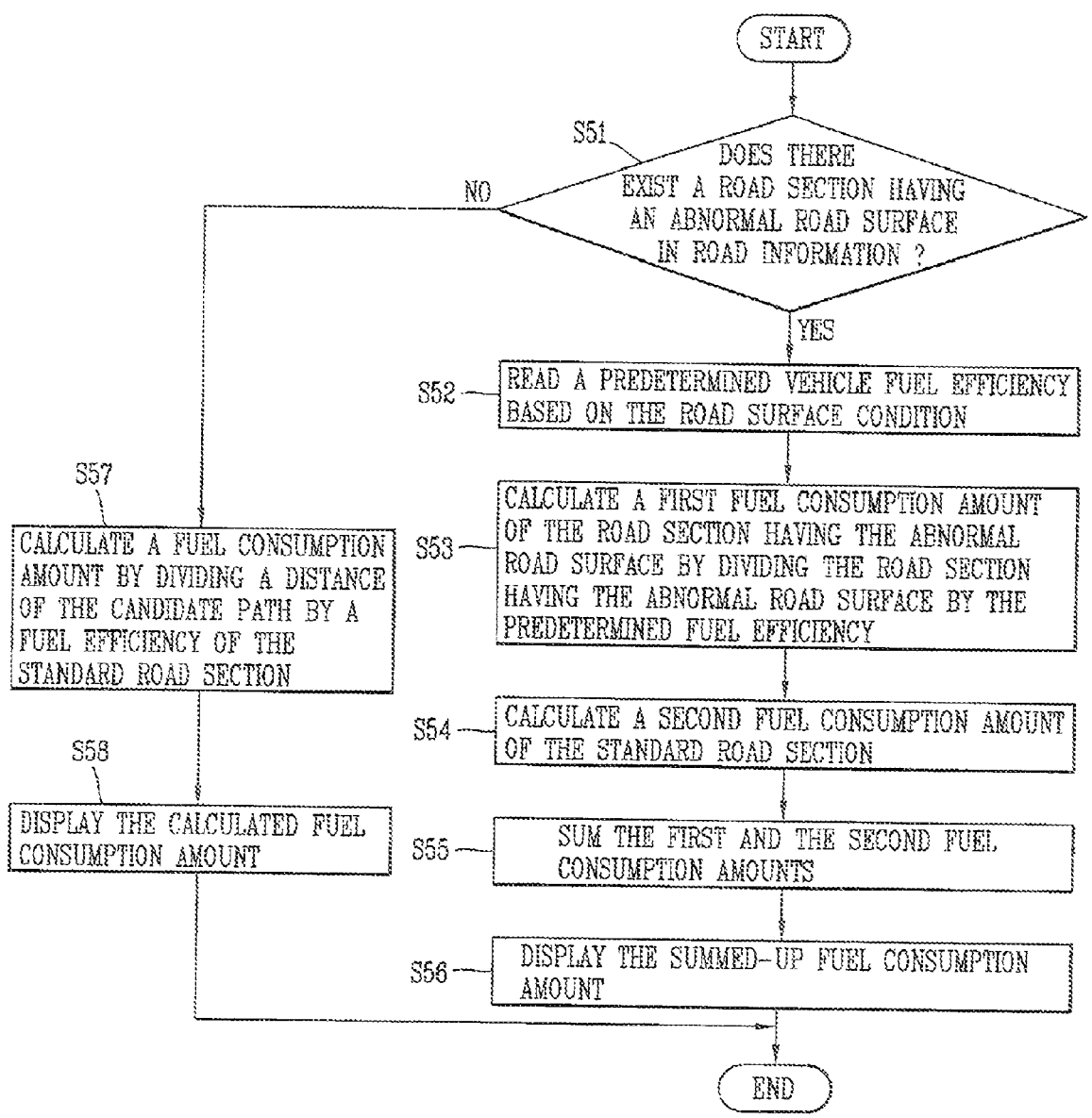
FIG. 12 is a flow chart illustrating a method of detecting a fuel consumption amount of a road section having an abnormal road surface included in road information according to an embodiment of the present invention.

Next, a method of detecting a vehicle fuel consumption of the each candidate path amount according to a road section having an abnormal road surface included in the road information of the each candidate path will be described with reference to the flowchart in FIG. 12. As shown, the controller 407 first determines whether or not the road section having an abnormal road surface exists in road information corresponding to each candidate path (S51). The road section having an abnormal road surface may include a raining or wet condition road section, a snowing or slick condition road section, a foggy road section, and the like. Furthermore, the controller 407 can detect the road section having an abnormal road surface (for example, raining road section, a snowing road section, a foggy road section, and the like) based on weather information included in the traffic message channel (TMC) and TPEG message.

The controller 407 then reads a predetermined vehicle fuel efficiency based on the road section condition from the storage unit 404 when the road section having an abnormal road surface exists in the road information (S52). The controller 407 also divides the road section having an abnormal road surface by a predetermined vehicle fuel efficiency based on the road section condition to calculate a fuel consumption amount of the road section having an abnormal road surface (S53). For example, assuming that the road section having an abnormal road surface is a raining or wet road section (10 km) and the fuel efficiency of the raining or wet road section is 10 km/l, the controller 407 can calculate a fuel consumption amount of the road section having an abnormal road surface by dividing the road section having an abnormal road surface (10 km) by the fuel efficiency (10 km/l) (road section (10 km)/fuel efficiency (10 km/l)=1 liter).

In other words, the fuel use amount being consumed for traveling the road section having an abnormal road surface of 10 km will be 1 liter. In addition, the fuel efficiency of the road section having an abnormal road surface can be measured through an experiment, and the fuel efficiency based on each road section condition can also measured by actually traveling the road section having an abnormal road surface (for example, a raining or wet road section, a snowing, ice or slick road section, a foggy road section, and the like).

The controller 407 then calculates a fuel consumption amount of the road section having an abnormal road surface, and calculates a fuel consumption amount of the standard road section based on the standard fuel efficiency (official fuel efficiency, 11 km/l) (S54). For example, assuming that a total distance corresponding to each path is 100 km and a distance of the standard road section in the total distance is 90 km, the standard road section (90 km) is divided by the fuel efficiency (11 km/l), thereby calculating a fuel consumption amount of the standard road section (standard road section (90 km)/fuel efficiency (11 km/l)=about 8.18 liter).

The controller 407 then sums a fuel consumption amount of the road section having an abnormal road surface and a fuel consumption amount of the standard road section (S55). For example, assuming that a distance of the first candidate path among the plurality of candidate paths is 100 km, and the 10 km-road section having an abnormal road surface exists in road information corresponding to the first candidate path and the standard road section is 90 km (100 km−10 km=90 km), the fuel consumption amount of 1 liter for the road section having an abnormal road surface and the fuel consumption amount of 8.18 liter for the standard road section are summed, thereby calculating a fuel consumption amount of the first candidate path (1 liter+8.18 liter=about 9.18 liter). The controller 407 then displays the summed fuel consumption amount on the display unit 405 (S56).

On the contrary, if the road section having an abnormal road surface does not exist in road information corresponding to the each candidate path (No in S51), the controller 407 calculates a fuel consumption amount of the candidate path by dividing a distance of the candidate path by a fuel efficiency of the standard road section (S57). For example, assuming that a distance corresponding to the candidate path is 100 km, the fuel consumption amount of the standard road section can be calculated by dividing the standard road section (100 km) by an official fuel efficiency (11 km/l) (standard road section (100 km)/fuel efficiency (11 km/l)=about 9.09 liter). The controller 407 then displays the calculated fuel consumption amount on the display unit 405 (S58).

Hereinafter, a vehicle fuel consumption amount displayed based on the road information of each candidate path, a toll, a distance and a required time of each candidate path will be described with reference to FIG. 13. As illustrated in FIG. 13, if a destination is input by the user, the controller 407 searches a plurality of candidate paths from a current location to the destination from the map data, and calculates a vehicle fuel consumption amount for traveling each of the plurality of candidate paths based on road information corresponding to each candidate path (for example, recommendation 1, recommendation 2, and recommendation 3). The controller 407 also displays the calculated vehicle fuel consumption amount on the display unit 405. For example, the controller 407 displays a first fuel consumption amount for traveling the first recom- Ecological, (Eco) FCI=Eco Fuel Consumption Amount/Fast Fuel Consumption Amount.

Fuel Consumption Amount:: Fuel consumption amount table as shown below can be used for each vehicle.

=Road Travel Cost+Additional Intersection Cost
=(Road Length)×(Speed, Fuel Consumption Amount per Slope)+Additional Fuel Consumption Amount
=Fuel_Consumption_table (Vehicle Speed, Slope)*Road Length+Stop & Go Modeling due to Cross Sections and Curves. Here, an average road travel speed is used for the vehicle speed.

| | Fuel consumption table [l/100 km] | | | | | | | | | | |
|---|---|---|---|---|---|---|---|---|---|---|---|
| | Vehicle speed [km/h] | | | | | | | | | | |
| Slope [%] | 50 | 60 | 70 | 80 | 90 | 100 | 110 | 120 | 130 | 140 | 150 |
| −8 | 0 | 0 | 0 | 0 | 0 | 0 | 0 | 1.6634 | 1.7684 | 2.2116 | 2.7819 |
| −4 | 1.3323 | 1.6093 | 1.8882 | 2.131 | 2.3295 | 2.5426 | 3.0626 | 3.6853 | 4.3986 | 5.159 | 6.0093 |
| 0 | 3.7452 | 3.9829 | 4.2942 | 4.6676 | 5.1156 | 5.6461 | 6.2195 | 6.9364 | 7.786 | 8.5554 | 10.1742 |
| 4 | 7.299 | 7.4067 | 7.6147 | 7.951 | 8.887 | 9.683 | 10.4981 | 11.7264 | 13.9574 | NP | NP |
| 8 | 11.1951 | 11.5738 | 12.1067 | 11.9379 | 14.0342 | 15.4911 | NP | NP | NP | NP | NP |
| 12 | 14.7018 | 15.02 | 15.7032 | 16.9846 | 18.4096 | NP | NP | NP | NP | NP | NP | mendation 1 (for example, a fastest path), a second fuel consumption amount for traveling the second recommendation 2 (for example, a shortest path), and a third fuel consumption amount for traveling the third recommendation 3 (for example, an ecological or scenic path) using a bar graph on the display unit 405, among the plurality of candidate paths.

In addition, the controller 407 calculates a toll to be paid when traveling each of the plurality of candidate paths, and displays the calculated toll, together with the fuel consumption amount, a distance and a required time on the display unit 405. Accordingly, the user can select his or her desired path by comparing the fuel consumption amounts, tolls, distances and required times of the plurality of candidate paths.

In addition, the controller 407 can also calculate an estimated amount of fuel needed to travel a corresponding candidate path based on several conditions (e.g., curved road, abnormal surface, etc.). Other conditions can also be used such as a) traffic conditions for the corresponding candidate path, b) a length of the corresponding candidate path, c) an elevation change of the corresponding candidate path, d) weather conditions for the corresponding candidate path, e) how many road lanes exist for the corresponding candidate path, f) toll information for the corresponding candidate path, g) a price of gas along the corresponding candidate path, h) construction occurring on the corresponding candidate path, i) accident information occurring for the corresponding candidate path, j) cell phone usage occurring for the corresponding candidate path, and k) police activity occurring on the corresponding candidate path. At least two of these conditions can also be used to calculate the fuel amount and thus the FCI.

Also, the following description is provided to further illustrate calculation of the FCI.

Definition of FCI (Fuel Consumption Index): A value indicating the fuel consumption amount of another path as an index when the fuel consumption amount of FAST path is 1. That is, a relative value of another option with respect to an estimated fuel consumption amount. In more detail, Fast FCI=1.00,
Short FCI=Short fuel Consumption Amount/Fast Fuel Consumption Amount, and The following relates to Stop & Go Modeling Fuel consumption amount extracted for each section by dividing into a deceleration section, a waiting section, and an acceleration section Additional Fuel Amount
=Deceleration Section Fuel Amount+Waiting Section Fuel Amount+Acceleration Section Fuel Amount−(Fuel Amount when traveling at V1)
={f(u1)*X/3+f(u2)*X/3+f(u3)*X/3}+{f(u1)*Z/3+f(u2)*Z/3+f(u3)*Z/3}+f(10)*Y−{(f(V1)*X+f(V2)*Z}.

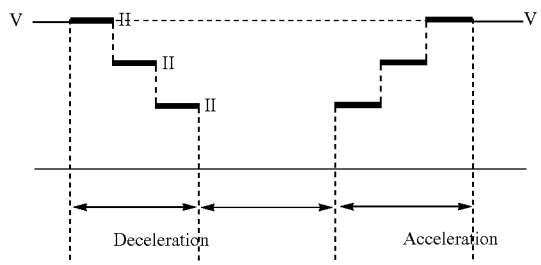

Thus, a navigation apparatus of a mobile terminal and a method thereof according to embodiments of the present invention searches a plurality of paths from a current position to a destination, and provides a vehicle fuel consumption amount of each of the searched plurality of paths to the user. In addition, a navigation apparatus of a mobile terminal and a method thereof according to an embodiment of the present invention searches a plurality of paths from a current position to a destination, and estimates a vehicle fuel consumption amount of each of the searched plurality of paths to the user, thereby providing an optimum path to the user.

It will be apparent to those skilled in this art that various changes and modifications may be made thereto without departing from the gist of the present invention. Accordingly, it should be noted that the embodiments disclosed in the present invention are only illustrative and not limitative to the spirit of the present invention, and the scope of the spirit of the invention is not limited by those embodiments. The scope protected by the present invention should be construed by the accompanying claims, and all the spirit within the equivalent scope of the invention should be construed to be included in the scope of the right of the present invention.

What is claimed is:

1. A navigation apparatus, comprising:
a wireless communication unit configured to wirelessly communicate with an entity;
a controller configured to search a plurality of candidate paths from a current location to a destination from map data, to detect travel time and distance for each of the plurality of candidate paths, and to calculate a fuel consumption index based on multiple road information conditions for a corresponding candidate path from the current location to the destination; and
a display unit configured to display the detected travel time and distance and the calculated fuel consumption index for each of the plurality of candidate paths,
wherein the fuel consumption index indicates an estimated amount of fuel used to travel the corresponding candidate path, and
wherein the multiple road information conditions comprise a curvature of a curved section for the corresponding candidate path, a cell phone usage frequency occurring for the corresponding candidate path, and police activity occurring on the corresponding candidate path.

2. The navigation apparatus of claim 1, wherein the plurality of road information include at least two of a) traffic conditions for the corresponding candidate path, b) a length of the corresponding candidate path, c) an elevation change of the corresponding candidate path, d) weather conditions for the corresponding candidate path, e) how many road lanes exist for the corresponding candidate path, f) toll information for the corresponding candidate path, g) a price of gas along the corresponding candidate path, h) construction occurring on the corresponding candidate path, and i) accident information occurring for the corresponding candidate path.

3. The navigation apparatus of claim 1, wherein the controller is further configured to display a first fuel consumption amount for traveling a first candidate path, a second fuel consumption amount for traveling a second candidate path, and a third fuel consumption amount for traveling a third candidate path on the display unit among the plurality of candidate paths.

4. The navigation apparatus of claim 1, wherein the road information conditions further comprise at least one of a road section having a predetermined road inclination, a stop-and-start road section, a road section having an abnotmal road surface, and a standard road section, and
wherein the standard road section represents a road section excluding the road section having the predetermined road inclination, the curved road section, the stop-and-start road section, and the road section having the abnormal road surface.

5. The navigation apparatus of claim 4, wherein the controller is further configured to determine a resultant fuel consumption amount by adding a fuel consumption amount for the road section having the predetermined road inclination, a fuel consumption amount for the curved road section, a fuel consumption amount for the stop-and-start road section, a fuel consumption amount for the road section having the abnormal road surface, and a fuel consumption amount for the standard road section in said each of the plurality of candidate paths, and to display the resultant fuel consumption amount as a total fuel consumption amount being consumed to travel from the current location to the destination.

6. The navigation apparatus of claim 4, wherein the controller is further configured to divide the road section having the predetermined road inclination by a predetemined vehicle fuel efficiency based on the predetermined road inclination so as to calculate a fuel consumption amount for the road section having the predetermined road inclination.

7. The navigation apparatus of claim 4, wherein the controller is further configured to divide the curved road section by a predetermined vehicle fuel efficiency based on the curved road section so as to calculate a fuel consumption amount for the curved road section.

8. The navigation apparatus of claim 4, wherein the controller is further configured to divide the stop-and-start road section by a predetermined vehicle fuel efficiency based on the stop-and-start road section so as to calculate a fuel consumption amount for the stop-and-start road section.

9. The navigation apparatus of claim 4, wherein the controller is further configured to divide the road section having the abnormal road surface by a predetermined vehicle fuel efficiency based on the road surface condition so as to calculate a fuel consumption amount for the road section having the abnormal road surface.

10. The navigation apparatus of claim 1, wherein the controller is further configured to display distances, required times and tolls for the plurality of candidate paths on the display unit.

11. The navigation apparatus of claim 1, wherein the road information conditions further comprise a deceleration section and stop section for coming to a stop for the corresponding candidate path, and an acceleration section after coming to the stop.

12. A method of controlling a navigation apparatus, the method comprising:
wirelessly communicate, via a wireless communication unit on the navigation apparatus, with an entity;
searching, via a controller on the navigation apparatus, a plurality of candidate paths from a current location to a destination from map data;
detecting travel time and distance for each of the plurality of candidate paths;
calculating, via the controller, a fuel consumption index based on multiple road information conditions for a corresponding candidate path from the current location to the destination; and
displaying the detected travel time and distance and the calculated fuel consumption index for each of the plurality of candidate paths on a display unit, wherein the fuel consumption index indicates an estimated amount of fuel used to travel the corresponding candidate path, wherein the multiple road information conditions comprise a curvature of a road section for the corresponding candidate path, a cell phone usage frequency occurring for the corresponding candidate path, and police activity occurring on the corresponding candidate path.

13. The method of claim 12, wherein the plurality of road information include at least two of a) traffic conditions for the corresponding candidate path, b) a length of the corresponding candidate path, c) an elevation change of the corresponding candidate path, d) weather conditions for the corresponding candidate path, e) how many road lanes exist for the corresponding candidate path, f) toll information for the corresponding candidate path, g) a price of gas along the corresponding candidate path, h) construction occurring on the corresponding candidate path, and i) accident information occurring for the corresponding candidate path.

14. The method of claim 12, further comprising:
displaying, on the display unit, a first fuel consumption amount for traveling a first candidate path, a second fuel consumption amount for traveling a second candidate path, and a third fuel consumption amount for traveling a third candidate path on the display unit among the plurality of candidate paths.

15. The method of claim 12, wherein the road information conditions further comprise at least one of a road section having a predetermined road inclination, a stop-and-start road section, a road section having an abnormal road surface, and a standard road section, and
wherein the standard road section represents a road section excluding the road section having the predetermined road inclination, the curved road section, the stop-and-start road section, and the road section having the abnormal road surface.

16. The method of claim 15, further comprising:
determining, via the controller, a resultant fuel consumption amount by adding a fuel consumption amount for the road section having the predetermined road inclination, a fuel consumption amount for the curved road section, a fuel consumption amount for the stop-and-start road section, a fuel consumption amount for the road section having the abnormal road surface, and a fuel consumption amount for the standard road section in said each of the plurality of candidate paths; and
displaying, on the display unit, the resultant fuel consumption amount as a total fuel consumption amount being consumed to travel from the current location to the destination.

17. The method of claim 15, further comprising:
dividing, by the controller, the road section having the predetermined road inclination by a predetermined vehicle fuel efficiency based on the predetermined road inclination so as to calculate a fuel consumption amount for the road section having the predetermined road inclination.

18. The method of claim 15, further comprising:
dividing, by the controller, the curved road section by a predetermined vehicle fuel efficiency based on the curved road section so as to calculate a fuel consumption amount for the curved road section.

19. The method of claim 15, further comprising:
dividing, by the controller, the stop-and-start road section by a predetermined vehicle fuel efficiency based on the stop-and-start road section so as to calculate a fuel consumption amount for the stop-and-start road section.

20. The method of claim 15, further comprising:
dividing, by the controller, the road section having the abnormal road surface by a predetemined vehicle fuel efficiency based on the road surface condition so as to calculate a fuel consumption amount for the road section having the abnormal road surface.

21. The method of claim 12, further comprising:
displaying, on the display unit, distances, required times and tolls for the plurality of candidate paths on the display unit.

22. The method of claim 11, wherein the road information conditions further comprise a deceleration section and stop section for coming to a stop for the corresponding candidate path, and an acceleration section after coming to the stop.

* * * * *